US010051522B2

(12) United States Patent
Bradley et al.

(10) Patent No.: US 10,051,522 B2
(45) Date of Patent: *Aug. 14, 2018

(54) SYSTEM AND METHOD FOR TRANSITIONING TO A VEHICLE NETWORK RESOURCE

(71) Applicant: Apple Inc., Cupertino, CA (US)

(72) Inventors: Bob Bradley, San Jose, CA (US); Daniel De Rocha Rosario, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,029

(22) Filed: Aug. 7, 2017

(65) Prior Publication Data
US 2017/0339601 A1    Nov. 23, 2017

Related U.S. Application Data

(63) Continuation of application No. 15/193,078, filed on Jun. 26, 2016, now Pat. No. 9,730,116, which is a continuation of application No. 13/913,102, filed on Jun. 7, 2013, now Pat. No. 9,380,507.

(51) Int. Cl.
| | |
|---|---|
| *H04W 36/00* | (2009.01) |
| *H04L 29/08* | (2006.01) |
| *H04W 48/12* | (2009.01) |
| *H04W 36/26* | (2009.01) |
| *H04W 36/24* | (2009.01) |
| *H04W 84/00* | (2009.01) |

(52) U.S. Cl.
CPC ......... *H04W 36/0016* (2013.01); *H04L 67/12* (2013.01); *H04W 36/24* (2013.01); *H04W 36/26* (2013.01); *H04W 48/12* (2013.01); *H04W 84/005* (2013.01)

(58) Field of Classification Search
CPC . H04W 36/0016; H04W 48/12; H04W 36/26; H04W 36/24; H04W 84/005; H04L 67/12
See application file for complete search history.

(56) References Cited

U.S. PATENT DOCUMENTS

| | | | |
|---|---|---|---|
| 7,848,278 B2 | 12/2010 | Chen et al. | |
| 8,254,914 B2 | 8/2012 | Lauer et al. | |
| 8,391,855 B2 * | 3/2013 | Matsuda ................. | H04L 51/38 455/41.1 |
| 8,600,367 B2 * | 12/2013 | Rau ................. | H04M 1/274516 455/418 |
| 8,914,077 B2 * | 12/2014 | Matsushita ......... | H04M 1/6091 455/41.1 |

(Continued)

*Primary Examiner* — Brandon J Miller
(74) *Attorney, Agent, or Firm* — Robert C. Kowert; Meyertons, Hood, Kivlin, Kowert & Goetzel, P.C.

(57) ABSTRACT

Systems and methods for transitioning between networks are disclosed. A multifunction device detects a vehicle network advertisement beacon over a first communication channel. The vehicle network advertisement beacon indicates wireless network capabilities of a wireless networking device hosting a wireless network in a vehicle. Responsive to detecting the vehicle network beacon over the first communication channel, a handoff process for migrating the multifunction device from a first wireless network to the wireless network in the vehicle is performed.

20 Claims, 13 Drawing Sheets

(56) References Cited

U.S. PATENT DOCUMENTS

| | | | |
|---|---|---|---|
| 9,380,507 B2* | 6/2016 | Bradley | H04W 36/24 |
| 9,730,116 B2* | 8/2017 | Bradley | H04W 36/24 |
| 2005/0037825 A1 | 2/2005 | Faranda Cordella et al. | |
| 2005/0049021 A1* | 3/2005 | Nedelcu | H04W 36/32 |
| | | | 455/575.9 |
| 2008/0249711 A1* | 10/2008 | Matsuda | G01C 21/3608 |
| | | | 701/443 |
| 2010/0197362 A1* | 8/2010 | Saitoh | H04M 1/274516 |
| | | | 455/569.2 |
| 2010/0203830 A1* | 8/2010 | Warren | H04M 1/6091 |
| | | | 455/41.2 |
| 2011/0013605 A1 | 1/2011 | Moeller | |
| 2011/0105197 A1* | 5/2011 | Chen | H04M 1/6066 |
| | | | 455/569.2 |
| 2011/0275358 A1* | 11/2011 | Faenger | H04W 8/24 |
| | | | 455/420 |
| 2011/0286428 A1* | 11/2011 | Souissi | H04L 12/2812 |
| | | | 370/331 |
| 2012/0244814 A1* | 9/2012 | Okayasu | H04M 1/6066 |
| | | | 455/41.3 |
| 2013/0103779 A1 | 4/2013 | Bai et al. | |
| 2013/0231052 A1 | 9/2013 | Eling et al. | |
| 2013/0288606 A1* | 10/2013 | Kirsch | H04M 1/6091 |
| | | | 455/41.3 |
| 2014/0018000 A1* | 1/2014 | Seymour | H04W 48/16 |
| | | | 455/41.2 |
| 2014/0189801 A1* | 7/2014 | Rokusek | G06F 21/00 |
| | | | 726/4 |

* cited by examiner

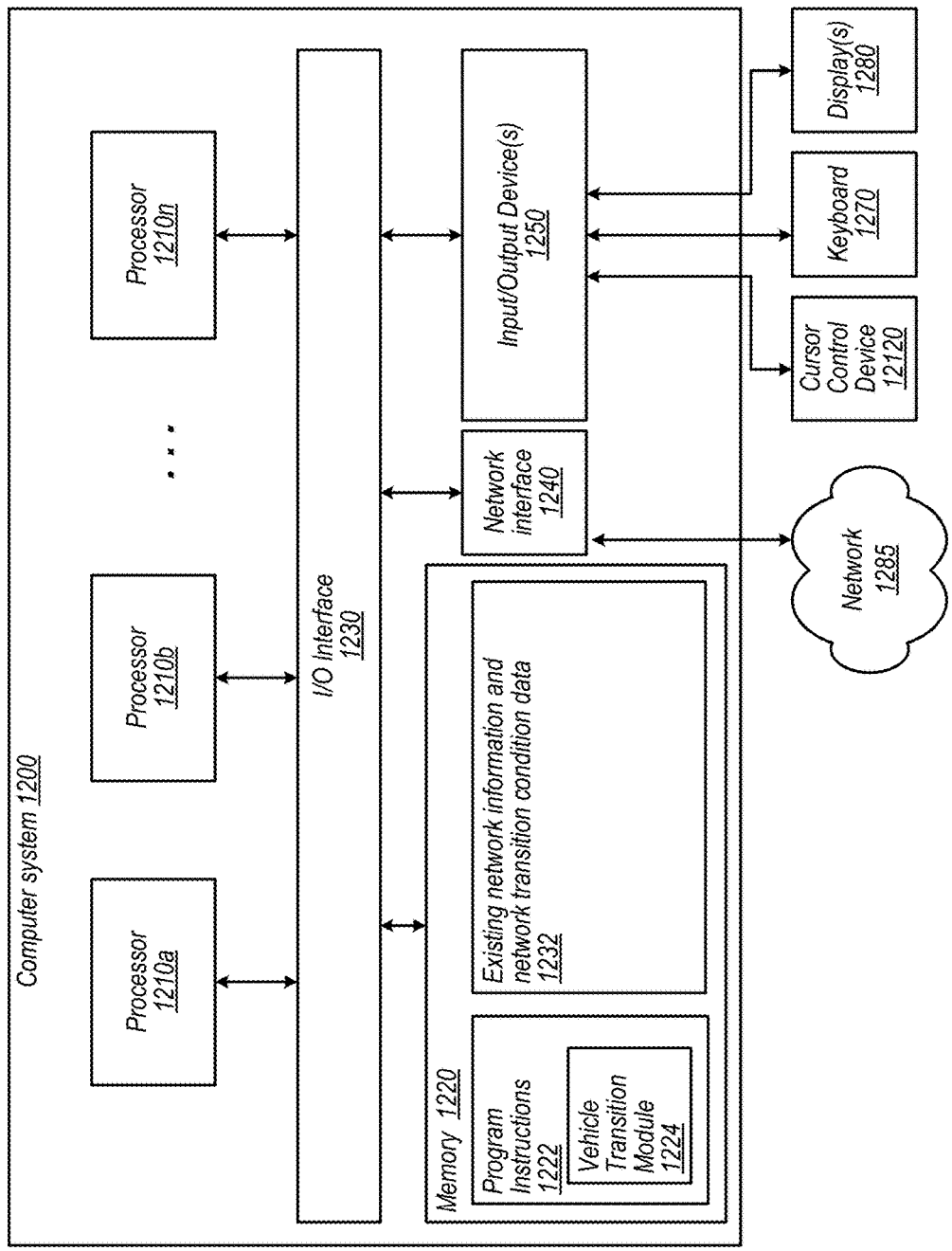

US 10,051,522 B2

SYSTEM AND METHOD FOR TRANSITIONING TO A VEHICLE NETWORK RESOURCE

This application is a continuation of U.S. patent application Ser. No. 15/193,078, filed Jun. 26, 2016, now U.S. Pat. No. 9,730,116, which is a continuation of U.S. patent application Ser. No. 13/913,102, filed Jun. 7, 2013, now U.S. Pat. No. 9,380,507, which are hereby incorporated by reference in their entirety.

BACKGROUND

Technical Field

This disclosure relates generally to use of network resources, and, more specifically, to transitioning between networks.

Description of the Related Art

Mobile computing devices (also called multifunction devices) frequently need to transition to use of a wireless network supplied by a vehicle from use of a wireless network previously (or contemporaneously) available from a fixed-location base station. For example, a user may desire transition from an airport terminal network to a network in an airplane, or from a network in a user's home to a network in a car.

Using current technology, this transition is frequently accomplished only when the network of the fixed base station is no longer reachable or, alternatively, requires crude manual interventions by the user to establish the transition. With the proliferation of devices available to users, the increase in services provided by those multifunction devices (e.g., music, video, phone personal assistant, navigation), and the increase in services provided by embedded systems (e.g., vehicle telemetry and control, navigation, phone, various configurations of radio, safety information), the need for less error prone and more efficient transition processes is steadily becoming more urgent.

SUMMARY OF EMBODIMENTS

Systems and methods for transitioning between networks are disclosed. A multifunction device detects a vehicle network advertisement beacon over a first communication channel. The vehicle network advertisement beacon indicates wireless network capabilities of a wireless networking device hosting a wireless network in a vehicle. Responsive to detecting the vehicle network beacon over the first communication channel, a handoff process for migrating the multifunction device from a first wireless network to the wireless network in the vehicle is performed.

BRIEF DESCRIPTION OF THE DRAWINGS

FIG. 12 illustrates an example computer system configured to implement aspects of the system and method for negotiating control of a shared resource.

DETAILED DESCRIPTION

Introduction

Figure 1:
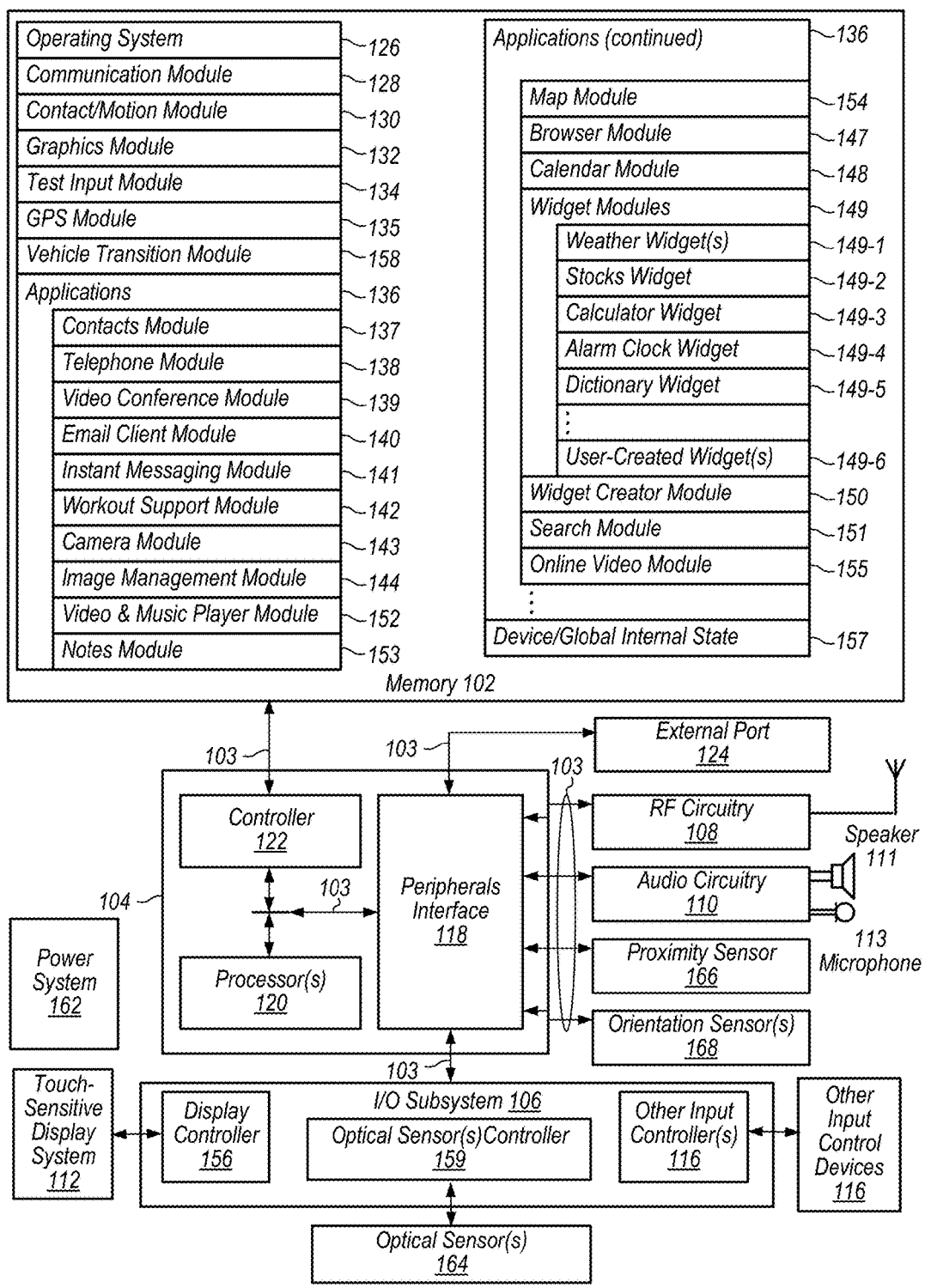
FIG. 1 illustrates a block diagram of a portable multifunction device in accordance with some embodiments.

Various embodiments of a system and method for transitioning to a wireless network of a vehicle are disclosed. In some embodiments, the network transition tools, sharing applications, vehicle transition modules and/or arbiter applications described herein may be implemented as part of various multifunction devices, including but not limited to mobile phones that have GPS functionality, tablet computing devices, and/or personal navigation devices. A user of such a multifunction device may, for example, be a driver or passenger of an automobile or other vehicle, and the network transitioning tools, sharing applications, and/or allocation applications described herein may allow network traffic of the multifunction device to be routed to the various network systems of the vehicle. In some embodiments, the transitioning tools, sharing applications, and/or allocation applications described herein may be implemented as part of various systems of a vehicle, such as the computers operating on an automobile, boat or airplane.

A method for transitioning to a network resource of a vehicle is provided. In some embodiments, the method includes detecting in a multifunction device a vehicle network advertisement beacon over a first communication channel. The vehicle network advertisement beacon indicates wireless network capabilities of a wireless networking device hosting a wireless network in a vehicle. In some embodiments, the method further includes, responsive to detecting the vehicle network beacon over the first communication channel, performing a handoff process for migrating the multifunction device from a first wireless network to the wireless network in the vehicle. In some embodiments, the detecting in the multifunction device the vehicle network advertisement beacon over a first communication channel further includes detecting in the multifunction device the vehicle network advertisement beacon over a USB connection. While a wired connection using a USB interface is mentioned, one of skill in the art will readily realize, in light of having read the present specification, that a wide variety of wireless interfaces (e.g., Thunderbolt, Serial, Firewire, etc.) can be used in embodiments without departing from the scope and intent of the current specification. In some embodiments, the detecting in the multifunction device the vehicle network advertisement beacon over a first communication channel further includes detecting in the multifunction device the vehicle network advertisement beacon using Bluetooth device recognition. In some embodiments, performing the handoff process for migrating the multifunction device from a first wireless network to the wireless network in the vehicle further includes providing authentication information for verifying the multifunction device as an authorized user of the wireless networking device hosting a wireless network in a vehicle and establishing communication with resources of the vehicle over the wireless network in a vehicle. Examples of such authentication information include but are not limited to personal identification numbers (PINs) or quick response (QR) codes. Examples of such resources include but are not limited to human interface devices such as view screens, speakers, and touch controls.

In some embodiments, performing the handoff process for migrating the multifunction device from a first wireless network to the wireless network in the vehicle further includes determining capabilities of the first wireless network, querying capabilities of the wireless network in the vehicle, determining a set of conditions for transitioning from the first wireless network to the wireless network in the vehicle, and responsive to an occurrence of one or more of the set of conditions for transitioning from the first wireless network to the wireless network in the vehicle, transitioning from the first wireless network to the wireless network in the vehicle.

In some embodiments, performing the handoff process for migrating the multifunction device from a first wireless network to the wireless network in the vehicle further includes determining capabilities of the first wireless network, querying capabilities of the wireless network in the vehicle, querying entitlements of a set of other multifunction devices in the vehicle, determining a set of conditions for allocating one or more resources of the vehicle, and responsive to an occurrence of one or more of the set of conditions for allocating the one or more resources of the vehicle, allocating the one or more resources of the vehicle. In some embodiments, performing the handoff process for migrating the multifunction device from a first wireless network to the wireless network in the vehicle further includes providing authentication information for verifying the multifunction device as an authorized user of the wireless networking device hosting a wireless network in a vehicle and automatically establishing communication with resources of the vehicle over the wireless network in a vehicle without user intervention.

A method for transitioning to a network resource of a vehicle is provided. In some embodiments, the method includes detecting in a multifunction device a vehicle network advertisement beacon over a first communication channel. Prior to detecting the vehicle network advertisement beacon, the multifunction device is communicating with a first wireless network provided by a fixed-location base station using a network communication protocol. The vehicle network advertisement beacon is transmitted by a vehicle over the first communication channel using a second communication protocol different from the network communication protocol. The vehicle network advertisement beacon indicates wireless network capabilities of a mobile wireless networking device hosting a mobile wireless network in the vehicle. Responsive to detecting the vehicle network advertisement beacon over the first communication channel, the method further includes performing a handoff process for migrating the multifunction device from communicating with the first wireless network to communicating with the mobile wireless network in the vehicle. The communicating with the mobile wireless network in the vehicle further comprises communicating with the mobile wireless network in the vehicle using the network communication protocol. In some embodiments, the first wireless network is a wifi network, the mobile wireless network is a wifi network, and the network communication protocol is an 802.11 protocol.

A method for transitioning to a network resource of a vehicle is provided. In some embodiments, the method includes, at a multifunction device, communicating with a first wireless network provided by a fixed-location base station using a first communication protocol. The method further includes detecting a vehicle network advertisement beacon over a first communication channel. The vehicle network advertisement beacon is transmitted by a mobile wireless networking device hosting a mobile wireless network in a vehicle. The vehicle network advertisement beacon is transmitted using a second communication protocol different from the first communication protocol. The vehicle network advertisement beacon indicates wireless network capabilities of the mobile wireless networking device. Responsive to detecting the vehicle network advertisement beacon over the first communication channel, the method further includes performing a handoff process for migrating the multifunction device from the first wireless network to the mobile wireless network in the vehicle. The method further includes communicating with the mobile wireless network in the vehicle using the first communication protocol.

Some embodiments may include a means for transitioning to a network resource of a vehicle. For example, a vehicle transition module may perform detecting in a multifunction device a vehicle network advertisement beacon over a first communication channel, as described herein. The vehicle network advertisement beacon indicates wireless network capabilities of a wireless networking device hosting a wireless network in a vehicle. In some embodiments, the vehicle transition module may perform, responsive to detecting the vehicle network beacon over the first communication channel, performing a handoff process for migrating the multifunction device from a first wireless network to the wireless network in the vehicle, as described herein.

The vehicle transition module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform detecting in a multifunction device a vehicle network advertisement beacon over a first communication channel, as described herein. The vehicle network advertisement beacon indicates wireless network capabilities of a wireless networking device hosting a wireless network in a vehicle. In some embodiments, computer-readable storage medium may store program instructions executable by the one or more processors to cause the computing apparatus to perform, responsive to detecting the vehicle network beacon over the first communication channel, performing a handoff process for migrating the multifunction device from a first wireless network to the wireless network in the vehicle, as described herein. Other embodiments of a vehicle transition module may be at least partially implemented by hardware circuitry and/or firmware stored, for example, in a non-volatile memory.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Near Field Communication (NFC) Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, vehicle transition module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video module and a music module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, vehicle transition module 158 negotiates control of a shared audio or visual resource of an automobile. A request for control of a shared audio or visual resource of the vehicle is received at vehicle transition module 158. Vehicle transition module 158 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 100) temporarily communicating with the vehicle. New state information regarding ownership of the shared audio or visual resource is determined by vehicle transition module 158 based at least in part on the request for control and the ownership transition conditions. The new state information indicates which of the processes controls output of the shared audio or visual resource of the vehicle. New ownership transition conditions of the shared audio or visual resource are determined by vehicle transition module 158 and communicated to a controller interface of the shared audio or visual resource.

In conjunction with RF circuitry 108, audio circuitry 110, speaker 111, microphone 113, touch screen 112, display controller 156, optical sensor 164, vehicle transition module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
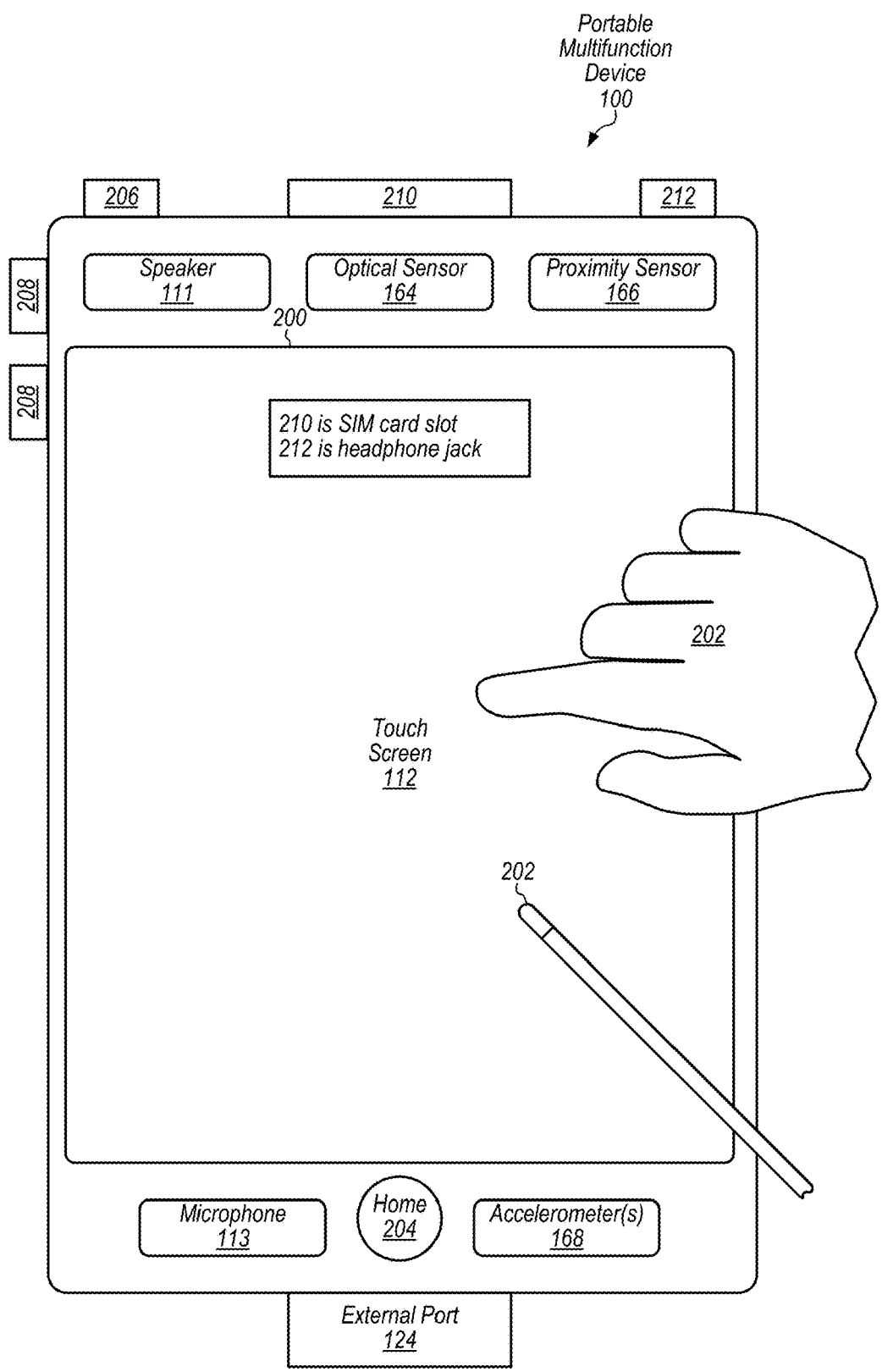
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Automotive Integration

Figure 3:
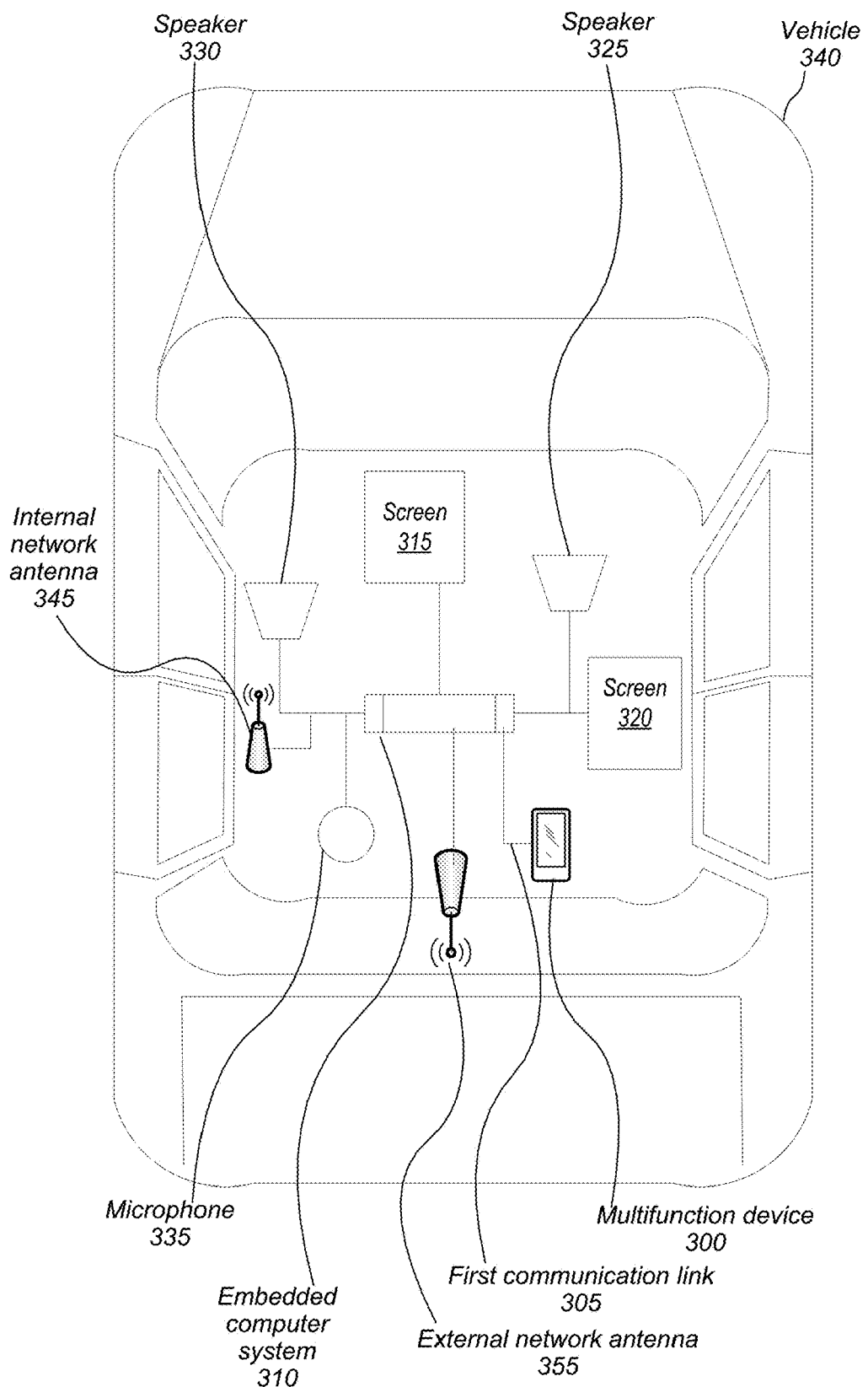
FIG. 3 illustrates a multifunction device interacting with network resources of a vehicle in accordance with some embodiments.

FIG. 3 illustrates a multifunction device interacting with network resources of a vehicle in accordance with some embodiments. A multifunction device 300 communicates over a first communication link 305 (connected e.g., via Bluetooth™ over RF circuitry 108 of FIG. 1 or a wire to external port 124 of FIG. 2) with an embedded computer system 310 of the vehicle 340. The embedded computer system 310 may be a general or special purpose computing device with processing and memory features similar to those discussed below with respect to FIG. 6. Embedded computer system 310 is attached to display screens 315 and 320 as well as speakers 325 and 330. A microphone 335 is likewise attached to embedded computer system 310. Embedded computer system communicates with an external network using an external network antenna 355 and provides an internal network to multifunction device 300 over an internal network antenna.

Multifunction device performs a method for transitioning to a network resource (an internal network thrown by internal network antenna 345 of vehicle 340. In some embodiments, multifunction device 300 detects a vehicle network advertisement beacon over a first communication channel, such as first communication link 305. The vehicle network advertisement beacon indicates wireless network capabilities of a wireless networking device, such as internal network antenna 345, hosting a wireless network in vehicle 340. Responsive to detecting the vehicle network beacon over the first communication channel, such as first communication link 305, multifunction device 300 performs a handoff process for migrating the multifunction device 300 from a first wireless network to the wireless network in the vehicle 340.

In some embodiments, multifunction device 300 performs detecting in the multifunction device the vehicle network advertisement beacon over a USB connection, which serves as first communication link 305. In some embodiments, multifunction device 300 performs detecting in the multifunction device the vehicle network advertisement beacon using Bluetooth device recognition, which serves as first communication link 305. In some embodiments, multifunction device 300 performs providing authentication information for verifying the multifunction device as an authorized user of the wireless networking device hosting a wireless network in a vehicle and establishing communication with resources of the vehicle over the wireless network in a vehicle. Examples of such authentication information include but are not limited to personal identification numbers (PINs) or quick response (QR) codes. In some embodiments, examples of such resources include but are not limited to human interface devices such as view screens 315 and 320, speakers 302 and 325, and external network antenna 355.

In some embodiments, multifunction device 300 performs determining capabilities of the first wireless network, querying capabilities of the wireless network in the vehicle, determining a set of conditions for transitioning from the first wireless network to the wireless network in the vehicle, and responsive to an occurrence of one or more of the set of conditions for transitioning from the first wireless network to the wireless network in the vehicle, transitioning from the first wireless network to the wireless network in the vehicle.

In some embodiments, multifunction device 300 performs determining capabilities of the first wireless network, querying capabilities of the wireless network in the vehicle, querying entitlements of a set of other multifunction devices in the vehicle, determining a set of conditions for allocating one or more resources of the vehicle, and responsive to an occurrence of one or more of the set of conditions for allocating the one or more resources of the vehicle, allocating the one or more resources of the vehicle. In some embodiments, multifunction device 300 performs providing authentication information for verifying the multifunction device as an authorized user of the wireless networking device hosting a wireless network in a vehicle and automatically establishing communication with resources of the vehicle over the wireless network in a vehicle without user intervention.

While embodiments are described with respect to an vehicle transition module or other arbiter executing on a multifunction device 300, one of skill in the art will readily comprehend in light of having read the attached disclosure that the disclosure is not so limited, and that embodiments of the vehicle transition modules described herein may also execute on other devices, such as embedded computer system 310 or may control embedded systems of devices other than automobiles, such as home security systems, entertainment systems or appliances. In some embodiments, a shared resource is a motor or actuator or feature other than an audio or visual resource.

General Vehicle Integration

Figure 4:
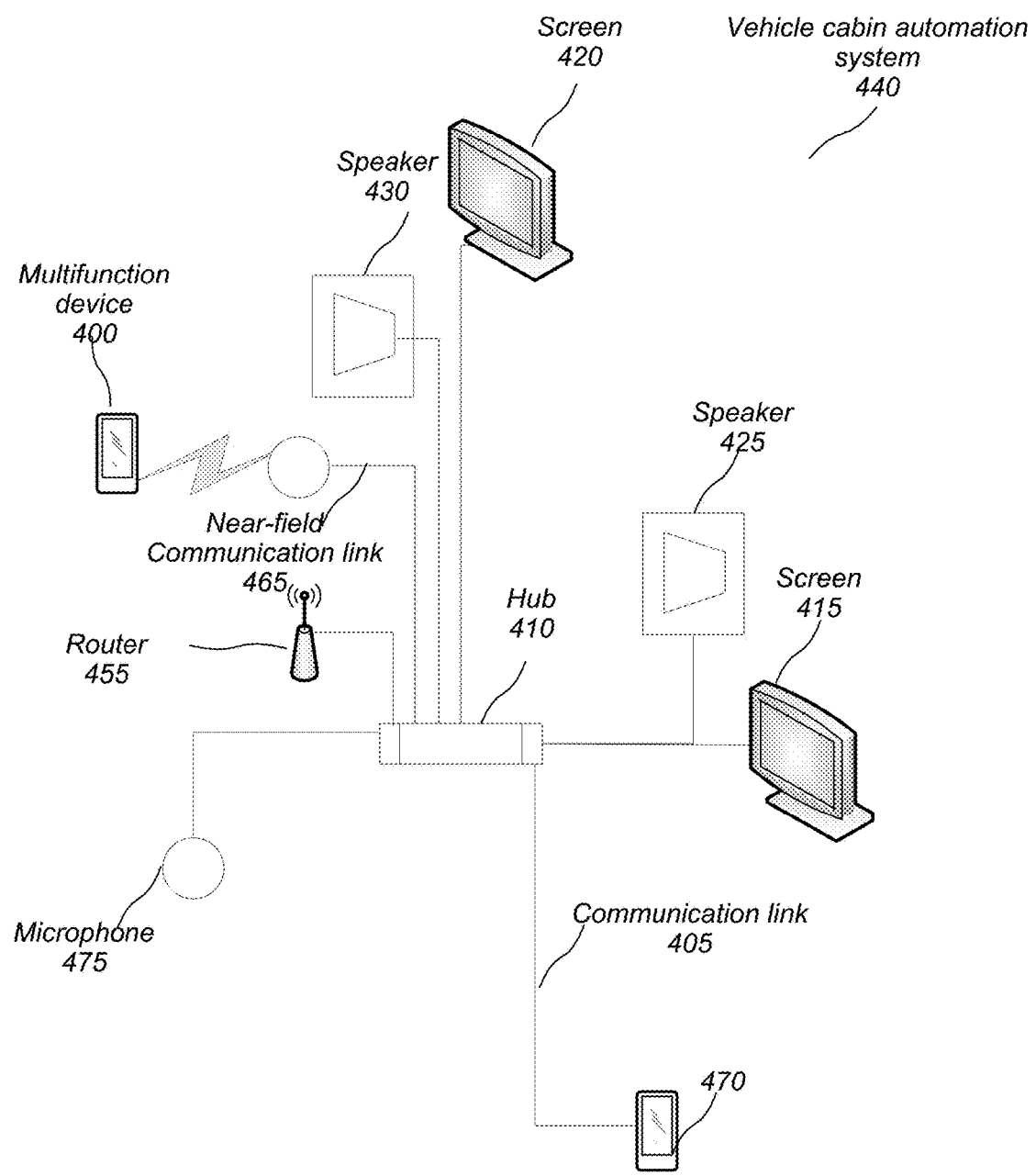
FIG. 4 illustrates a multifunction device interacting with network resources of a vehicle in accordance with some embodiments.
Figure 5:
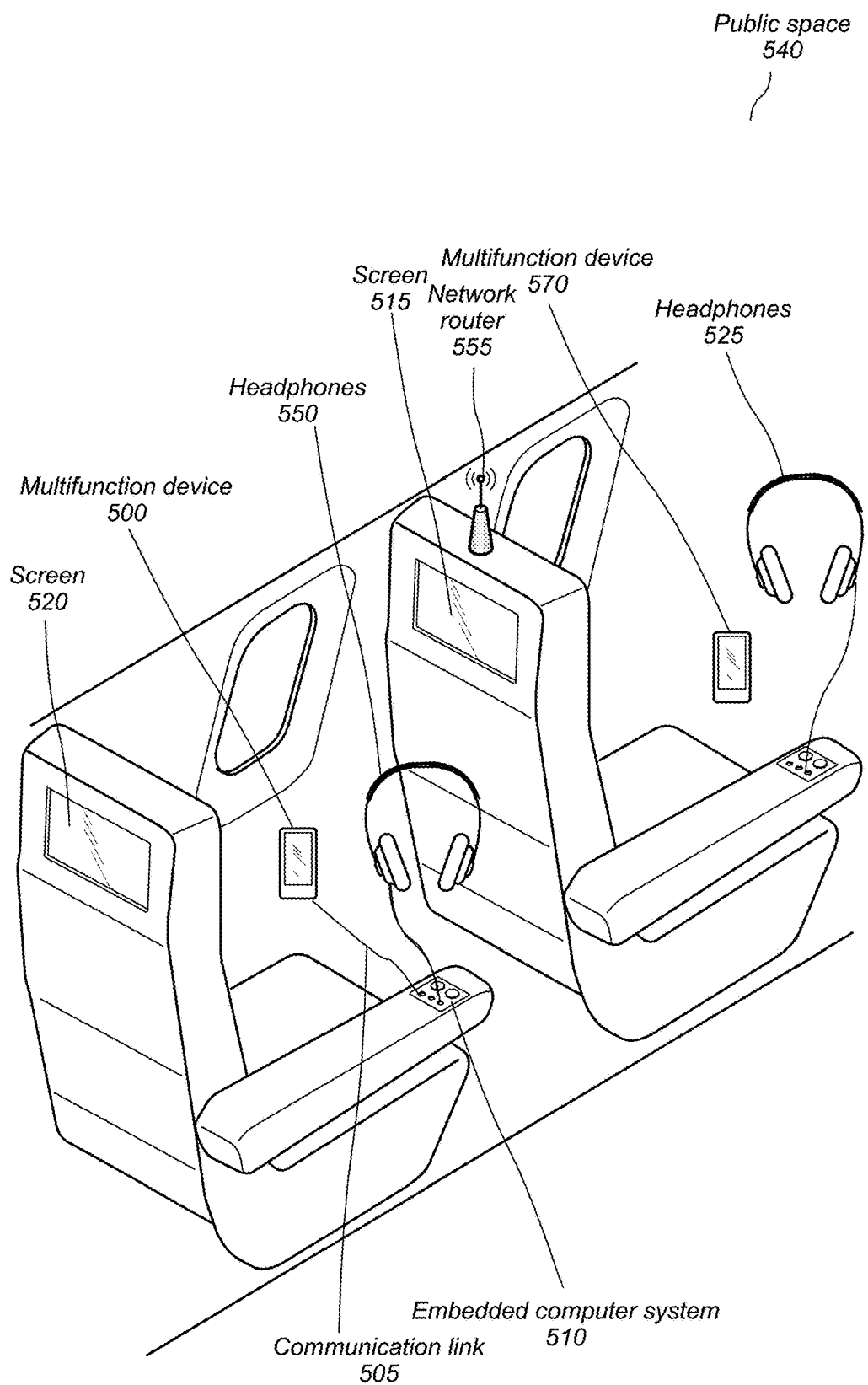
FIG. 5 illustrates a multifunction device interacting with network resources of an aircraft in accordance with some embodiments.

FIG. 4 illustrates a multifunction device interacting with network resources of a vehicle accordance with some embodiments. A multifunction device 470 communicates over a first communication link 405 (connected e.g., via Bluetooth™ over RF circuitry 108 of FIG. 1 or a wire to external port 124 of FIG. 2) with a hub 410 of a vehicle cabin automation system 440. Hub 410 may be a general or special purpose computing device with processing and memory features similar to those discussed below with respect to FIG. 6. Hub 410 is attached to display screens 415 and 420 as well as speakers 425 and 430. A microphone 475 is likewise attached to hub 410. Hub 410 communicates with an external network using an external network connection (not shown, as it may or may not be radio-frequency based) and provides an internal network to multifunction device 400 over a router 455. Some embodiments support wireline based external network communications. A near-field communication link 465 is provided for a multifunction device 400 to establish a first communication channel, as described below.

Multifunction device 400 performs a method for transitioning to a network resource (an internal network thrown by router 455 of vehicle 440. In some embodiments, multifunction device 400 detects a vehicle network advertisement beacon over a first communication channel, such as first communication link 405 or near-field communication link 465. The vehicle network advertisement beacon indicates wireless network capabilities of a wireless networking device, such as router 445, hosting a wireless network in vehicle 440. Responsive to detecting the vehicle network beacon over the first communication channel, such as first communication link 405, multifunction device 400 performs a handoff process for migrating the multifunction device 400 from a first wireless network to the wireless network in the vehicle cabin automation system 440.

In some embodiments, multifunction device 400 performs detecting in the multifunction device the vehicle network advertisement beacon over a USB connection, which serves as first communication link 405. In some embodiments, multifunction device 400 performs detecting in the multifunction device the vehicle network advertisement beacon using Bluetooth device recognition, which serves as first communication link 405. In some embodiments, multifunction device 400 performs providing authentication information for verifying the multifunction device as an authorized user of the wireless networking device hosting a wireless network in a vehicle and establishing communication with resources of the vehicle over the wireless network in a vehicle. Examples of such authentication information include but are not limited to personal identification numbers (PINs) or quick response (QR) codes. In some embodiments, examples of such resources include but are not limited to human interface devices such as view screens 415 and 420, speakers 402 and 425, and external network antenna network connection.

In some embodiments, multifunction device 400 performs determining capabilities of the first wireless network, querying capabilities of the wireless network in the vehicle, determining a set of conditions for transitioning from the first wireless network to the wireless network in the vehicle, and responsive to an occurrence of one or more of the set of conditions for transitioning from the first wireless network to the wireless network in the vehicle, transitioning from the first wireless network to the wireless network in the vehicle.

In some embodiments, multifunction device 400 performs determining capabilities of the first wireless network, querying capabilities of the wireless network in the vehicle, querying entitlements of a set of other multifunction devices in the vehicle, determining a set of conditions for allocating one or more resources of the vehicle, and responsive to an occurrence of one or more of the set of conditions for allocating the one or more resources of the vehicle, allocating the one or more resources of the vehicle. In some embodiments, multifunction device 400 performs providing authentication information for verifying the multifunction device as an authorized user of the wireless networking device hosting a wireless network in a vehicle and automatically establishing communication with resources of the vehicle over the wireless network in a vehicle without user intervention.

While embodiments are described with respect to an vehicle transition module or other arbiter executing on a multifunction device 400, one of skill in the art will readily comprehend in light of having read the attached disclosure that the disclosure is not so limited, and that embodiments of the vehicle transition modules described herein may also execute on other devices, such as hub 410 or may control embedded systems of devices other than automobiles, such as home security systems, entertainment systems or appliances. In some embodiments, a shared resource is a motor or actuator or feature other than an audio or visual resource.

Use in Public Spaces and Conveyances

A multifunction device 500 communicates over a first communication link 505 (connected e.g., via Bluetooth™ over RF circuitry 108 of FIG. 1 or a wire to external port 124 of FIG. 2) with an embedded computer system 510 of a public space 540. The embedded computer system 510 may be a general or special purpose computing device with processing and memory features similar to those discussed below with respect to FIG. 6. Embedded computer system 510 is attached to display screens 515 and 520 as well as headphones 525 and 550. Embedded computer system communicates with an external network using an external network (not shown) and provides an internal network to multifunction device 500 over a network router 555.

Multifunction device performs a method for transitioning to a network resource (an internal network thrown by internal network antenna 555 of public space 540. In some embodiments, multifunction device 500 detects a public space network advertisement beacon over a first communication channel, such as first communication link 505. The public space network advertisement beacon indicates wireless network capabilities of a wireless networking device, such as router 555, hosting a wireless network in public space 540. Responsive to detecting the public space network beacon over the first communication channel, such as first communication link 505, multifunction device 500 performs a handoff process for migrating the multifunction device 500 from a first wireless network to the wireless network in the public space 540.

In some embodiments, multifunction device 500 performs detecting in the multifunction device the public space network advertisement beacon over a USB connection, which serves as first communication link 505. In some embodiments, multifunction device 500 performs detecting in the multifunction device the public space network advertisement beacon using Bluetooth device recognition, which serves as first communication link 505. In some embodiments, multifunction device 500 performs providing authentication information for verifying the multifunction device as an authorized user of the wireless networking device hosting a wireless network in a public space and establishing communication with resources of the public space over the wireless network in a public space. Examples of such authentication information include but are not limited to personal identification numbers (PINs) or quick response (QR) codes. In some embodiments, examples of such resources include but are not limited to human interface devices such as view screens 515 and 520, and headphones 502 and 525.

In some embodiments, multifunction device 500 performs determining capabilities of the first wireless network, querying capabilities of the wireless network in the public space, determining a set of conditions for transitioning from the first wireless network to the wireless network in the public space, and responsive to an occurrence of one or more of the set of conditions for transitioning from the first wireless network to the wireless network in the public space, transitioning from the first wireless network to the wireless network in the public space.

In some embodiments, multifunction device 500 performs determining capabilities of the first wireless network, querying capabilities of the wireless network in the public space, querying entitlements of a set of other multifunction devices in the public space, determining a set of conditions for allocating one or more resources of the public space, and responsive to an occurrence of one or more of the set of conditions for allocating the one or more resources of the public space, allocating the one or more resources of the public space. In some embodiments, multifunction device 500 performs providing authentication information for verifying the multifunction device as an authorized user of the wireless networking device hosting a wireless network in a public space and automatically establishing communication with resources of the public space over the wireless network in a public space without user intervention.

While embodiments are described with respect to an public space transition module or other arbiter executing on a multifunction device 500, one of skill in the art will readily comprehend in light of having read the attached disclosure that the disclosure is not so limited, and that embodiments of the public space transition modules described herein may also execute on other devices, such as embedded computer system 510 or may control embedded systems of devices other than automobiles, such as home security systems, entertainment systems or appliances. In some embodiments, a shared resource is a motor or actuator or feature other than an audio or visual resource. Examples of such shared audio or visual resources in public spaces and conveyances include shared viewing screens in gyms (e.g., the row of televisions in front of an array of elliptical machines), gaming pods (e.g., the screen, couch and speaker combinations in college student centers) and audiovisual systems aboard trains, planes and fairies.

While embodiments are described with respect to an vehicle transition module executing on a multifunction device 500, one of skill in the art will readily comprehend in light of having read the attached disclosure that the disclosure is not so limited, and that embodiments of the vehicle transition modules described herein may also execute on other devices, such as embedded computer system 510 or circuitry built into communication link 505

Vehicle Transition Module

Figure 6:
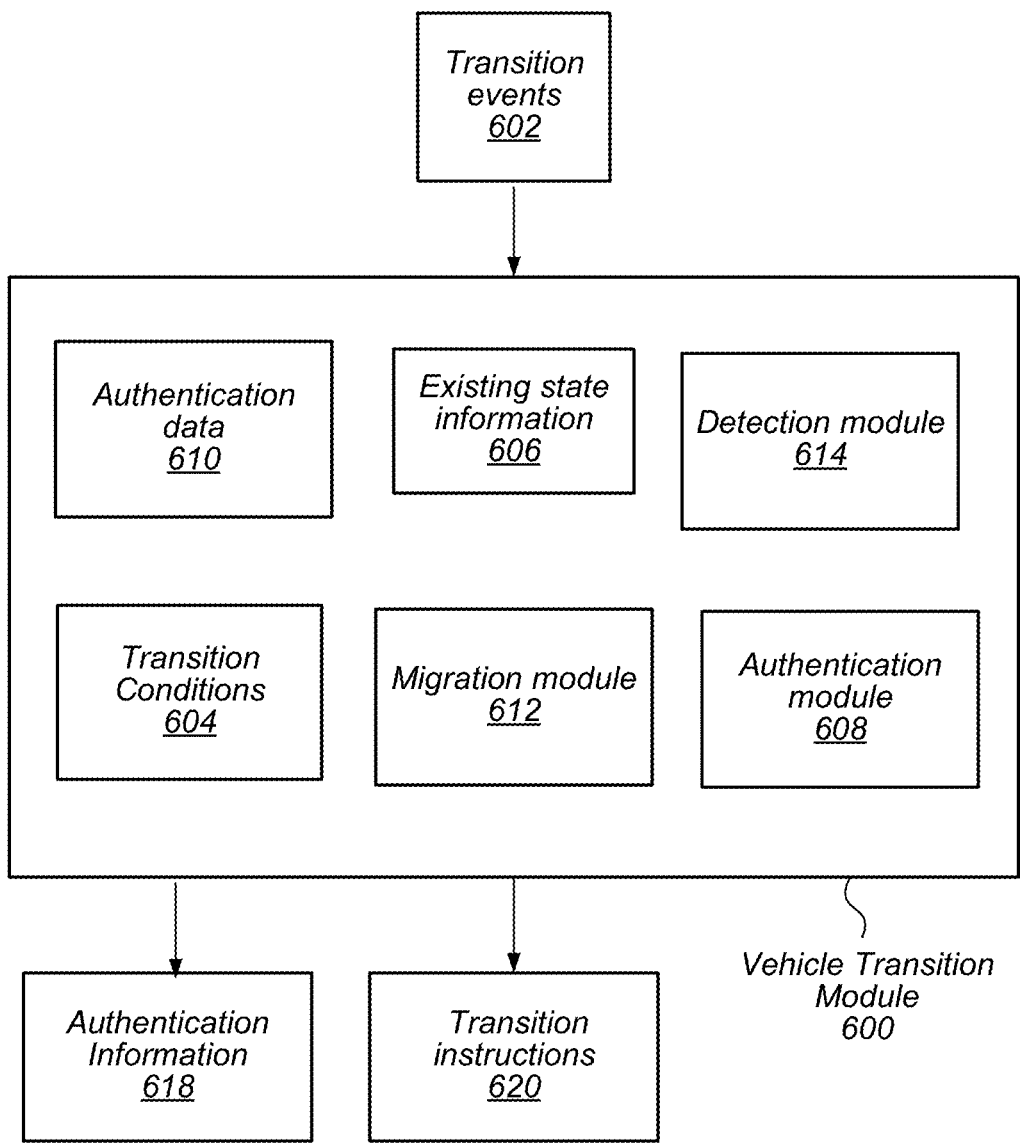
FIG. 6 illustrates a vehicle transition module for interacting with network resources of a vehicle, according to some embodiments.

FIG. 6 illustrates a vehicle transition module for interacting with network resources of a vehicle, according to some embodiments. A vehicle transition module 600, which performs or supervises other modules performing transitioning to a network resource of a vehicle, receives transition events 602, such as a vehicle network advertisement beacon detected over a first communication channel. The vehicle transition module 600 sends authentication information 618 and transition instructions 620, such as credentials and instructions for joining a network, respectively. Transition conditions 604 include rules for determining when to execute a network transition. Existing state information 606 details the status of connections of a multifunction device to a first wireless network and/or a wireless network in a vehicle. A detection module 614 performs or monitors other modules performing detecting in a multifunction device a vehicle network advertisement beacon over a first communication channel. An authentication module 608 generates authentication information 618 from authentication data 610, such as stored tokens. A migration module 612 performs or supervises, responsive to detecting the vehicle network beacon over the first communication channel, a handoff process for migrating the multifunction device from a first wireless network to the wireless network in the vehicle.

The vehicle network advertisement beacon received as part of transition events 602 indicates wireless network capabilities of a wireless networking device hosting a wireless network in a vehicle. In some embodiments, the detection module 614 performs detecting in the multifunction device the vehicle network advertisement beacon over a USB connection. In some embodiments, the detection module 614 performs detecting in the multifunction device the vehicle network advertisement beacon using Bluetooth device recognition. In some embodiments, authentication module 608 performs providing authentication information for verifying the multifunction device as an authorized user of the wireless networking device hosting a wireless network in a vehicle and establishing communication with resources of the vehicle over the wireless network in a vehicle. Examples of authentication information 618, which may be stored as authentication data 610, include but are not limited to personal identification numbers (PINs) or quick response (QR) codes. Examples of such resources include but are not limited to human interface devices such as view screens, speakers, and touch controls.

In some embodiments, migration module 612 performs determining capabilities of the first wireless network, querying capabilities of the wireless network in the vehicle, determining a set of conditions for transitioning from the first wireless network to the wireless network in the vehicle, and responsive to an occurrence of one or more of the set of conditions for transitioning from the first wireless network to the wireless network in the vehicle, transitioning from the first wireless network to the wireless network in the vehicle.

In some embodiments, migration module 612 performs determining capabilities of the first wireless network, querying capabilities of the wireless network in the vehicle, querying entitlements of a set of other multifunction devices in the vehicle, determining a set of conditions for allocating one or more resources of the vehicle, and responsive to an occurrence of one or more of the set of conditions for allocating the one or more resources of the vehicle, allocating the one or more resources of the vehicle.

In some embodiments, authentication module 608 performs providing authentication information for verifying the multifunction device as an authorized user of the wireless networking device hosting a wireless network in a vehicle and automatically establishing communication with resources of the vehicle over the wireless network in a vehicle without user intervention.

Example Operations

Figure 7A:
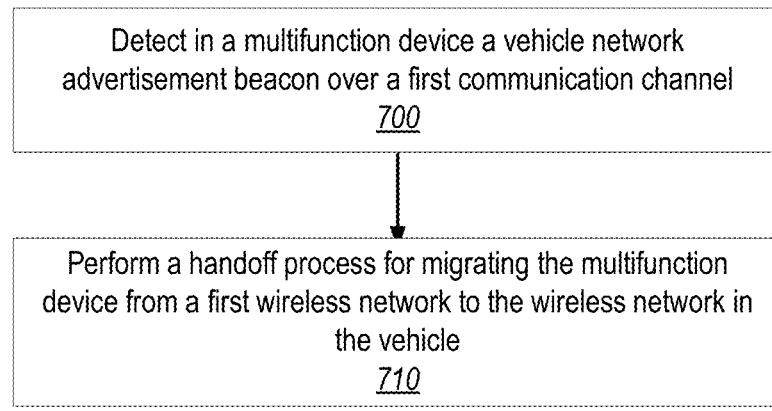
FIG. 7A is a flow diagram illustrating one embodiment of operations for transitioning to a network resource of a vehicle.

FIG. 7A is a flow diagram illustrating one embodiment of a operations for transitioning to a network resource of a vehicle. A vehicle network advertisement beacon over a first communication channel is detected by a multifunction device (block 700). A handoff process for migrating the multifunction device from a first wireless network to the wireless network in the vehicle is performed (block 710).

Figure 7B:
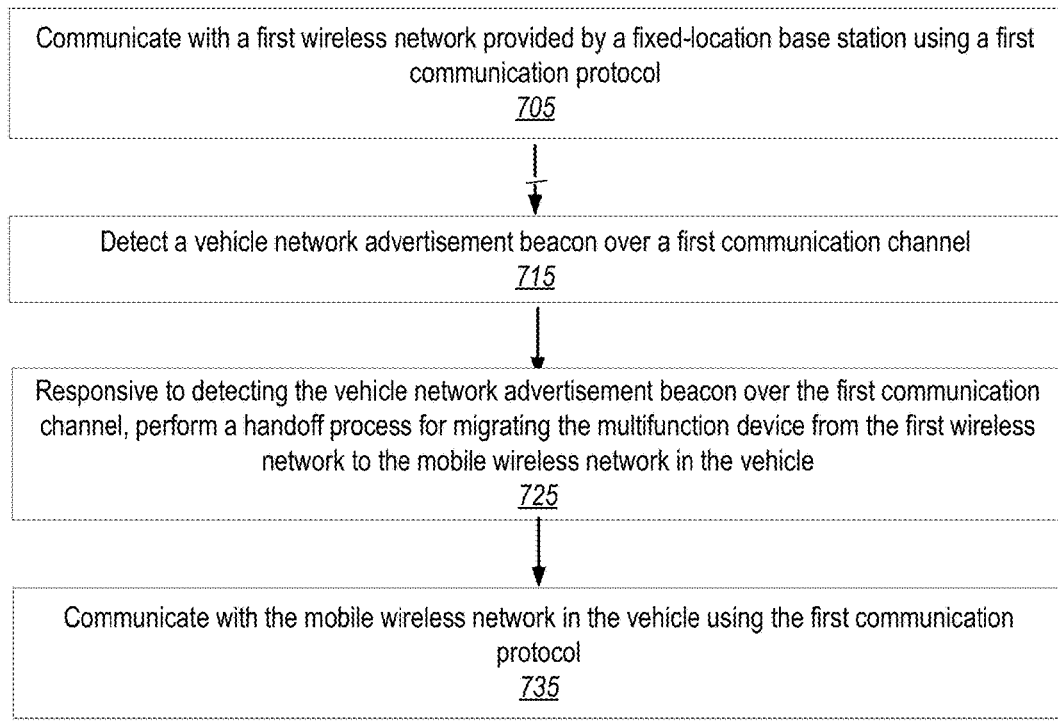
FIG. 7B is a flow diagram illustrating one embodiment of operations for transitioning to a network resource of a vehicle.

FIG. 7B is a flow diagram illustrating one embodiment of operations for transitioning to a network resource of a vehicle. A multifunction device performs communicating with a first wireless network provided by a fixed-location base station using a first communication protocol (block 705). A vehicle network advertisement beacon is detected over a first communication channel (block 715). Responsive to detecting the vehicle network advertisement beacon over the first communication channel, a handoff process for migrating the multifunction device from the first wireless network to the mobile wireless network in the vehicle is performed (block 725). The multifunction device communicates with the mobile wireless network in the vehicle using the first communication protocol (block 735).

Figure 8:
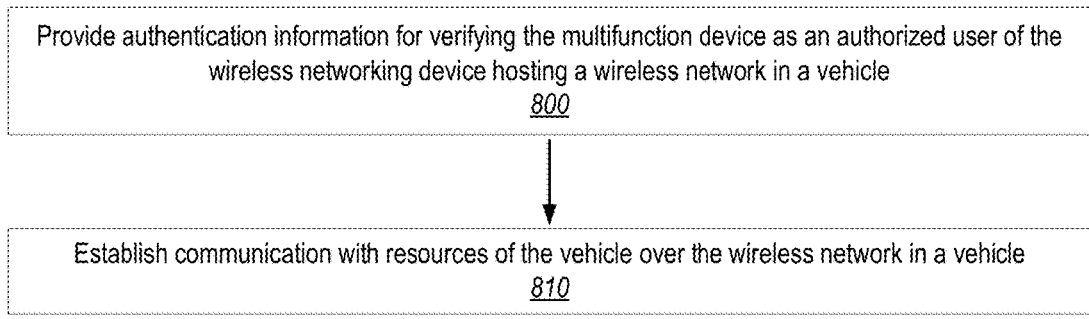
FIG. 8 is a flow diagram illustrating one embodiment of operations for transitioning to a network resource of a vehicle.

FIG. 8 is a flow diagram illustrating one embodiment of a operations for transitioning to a network resource of a vehicle. Authentication information for verifying the multifunction device as an authorized user of the wireless networking device hosting a wireless network in a vehicle is provided (block 800). Communication with resources of the vehicle is established over the wireless network in the vehicle (block 810).

Figure 9:
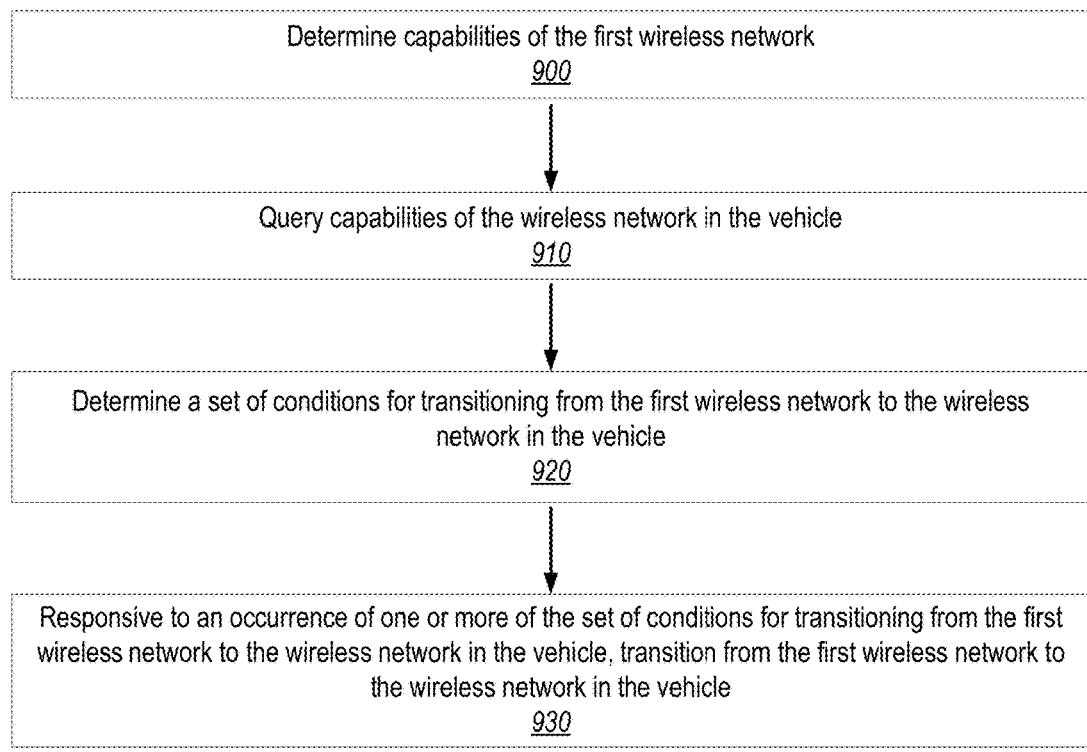
FIG. 9 is a flow diagram illustrating one embodiment of operations for transitioning to a network resource of a vehicle.

FIG. 9 is a flow diagram illustrating one embodiment of a operations for transitioning to a network resource of a vehicle. Capabilities of the first wireless network are determined (block 900). Capabilities of the wireless network in the vehicle are queried (block 910). A set of conditions for transitioning from the first wireless network to the wireless network in the vehicle is determined (block 920). Responsive to an occurrence of one or more of the set of conditions for transitioning from the first wireless network to the wireless network in the vehicle, a transition from the first wireless network to the wireless network in the vehicle is executed (block 930).

Figure 10:
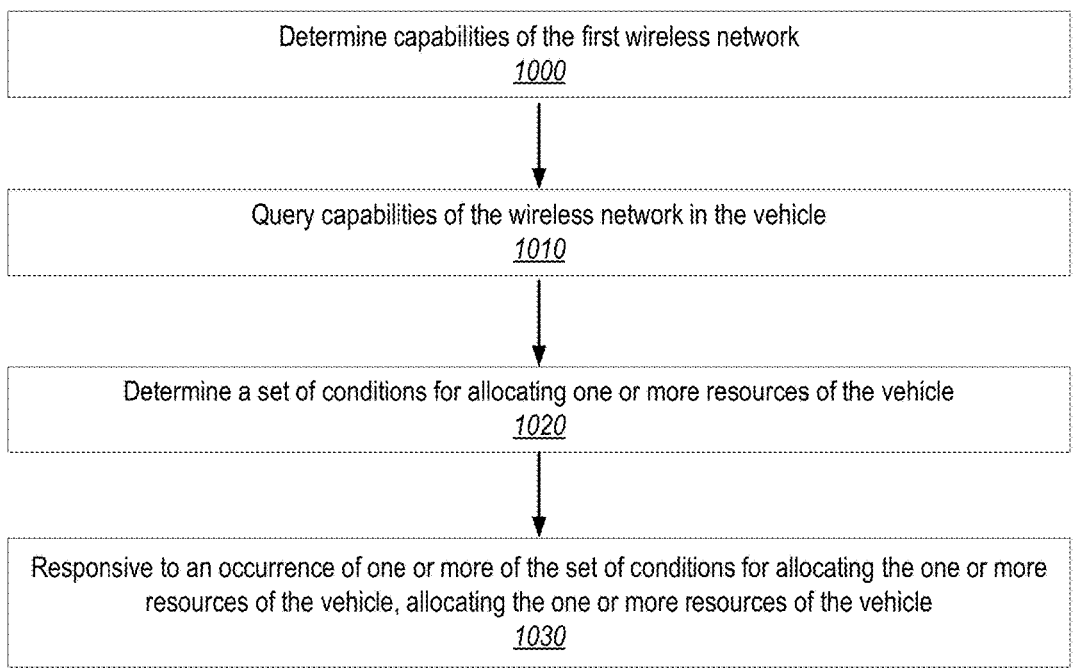
FIG. 10 is a flow diagram illustrating one embodiment of operations for transitioning to a network resource of a vehicle.

FIG. 10 is a flow diagram illustrating one embodiment of a operations for transitioning to a network resource of a vehicle. Capabilities of the first wireless network are determined (block 1000). Capabilities of the wireless network in the vehicle are queried (block 1010). A set of conditions for allocating one more resources of the vehicle is determined (block 1020). Responsive to an occurrence of one or more of the set of conditions for allocating the one or more resources of the vehicle, one or more resources of the vehicle are allocated (block 1030).

Figure 11:
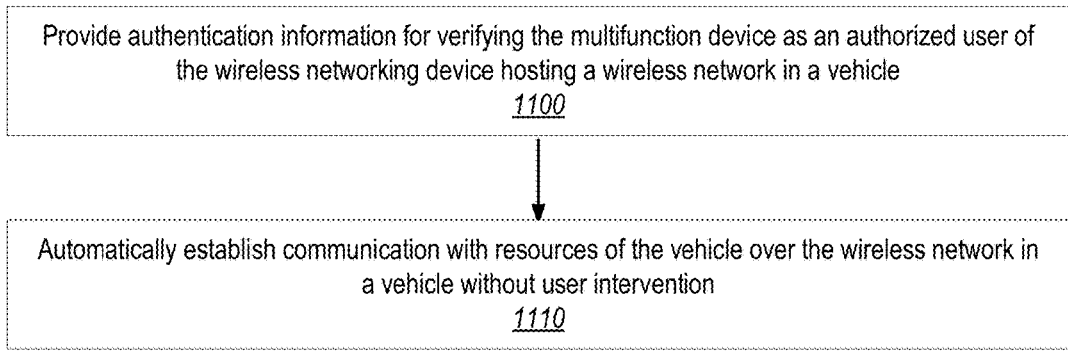
FIG. 11 is a flow diagram illustrating one embodiment of operations for transitioning to a network resource of a vehicle.

FIG. 11 is a flow diagram illustrating one embodiment of a operations for transitioning to a network resource of a vehicle. Authentication information for verifying the multifunction device as an authorized user of the wireless networking device hosting a wireless network in a vehicle is provided (block 1100). Communication with resources of the vehicle is automatically established over the wireless network in the vehicle without user intervention (block 1110).

Example Computer System

FIG. 12 illustrates computer system 1200 that is configured to execute any or all of the embodiments described above. In different embodiments, computer system 1200 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 1200, which may interact with various other devices. Note that any component, action, or functionality described above with respect to FIGS. 1-5 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 and/or existing state information and ownership transition condition data 1232 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a mapping application 1224 incorporating any of the functionality described above. Additionally, existing state information and ownership transition condition data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above, such as the methods illustrated by FIG. 8. In other embodiments, different elements and data may be included. Note that data 1232 may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method, comprising:
   transmitting, via a wireless network hosted by a wireless networking device of a vehicle, a vehicle network advertisement beacon over a first communication channel to a multifunction device, wherein
      the multifunction device is in communication with a wireless network provided by a fixed location base station using a first communication protocol, and
      the vehicle network advertisement beacon is transmitted using a second communication protocol different from the first communication protocol; and
   establishing communication, via the wireless network hosted by the wireless networking device of the vehicle, with the multifunction device using the second communication protocol.

2. The method of claim 1, wherein the transmitting the vehicle network advertisement beacon over the first communication channel comprises transmitting the vehicle network advertisement beacon over a USB connection to the multifunction device.

3. The method of claim 1, wherein the detecting transmitting the vehicle network advertisement beacon over the first communication channel comprises transmitting the vehicle network advertisement beacon using Bluetooth device recognition.

4. The method of claim 1, wherein
   the second communication protocol is an 802.11 protocol.

5. The method of claim 1, wherein the establishing communication with the multifunction device comprises:
   receiving a query for one or more capabilities of the wireless network hosted by the wireless networking device of the vehicle; and
   allocating one or more resources of the vehicle.

6. The method of claim 1, wherein the establishing communication with the multifunction device comprises:
   receiving a query for one or more capabilities of the wireless network hosted by the wireless networking device of the vehicle; and
   responsive to an occurrence of at least one condition of a set of one or more conditions for allocating one or more resources of the vehicle, allocating the one or more resources of the vehicle.

7. The method of claim 1, wherein the establishing communication with the multifunction device comprises:
   receiving, from the multifunction device, authentication information for verifying the multifunction device as an authorized user of the wireless networking device hosting the wireless network in the vehicle; and
   automatically establishing communication between the multifunction device and resources of the vehicle over the wireless network hosted by the wireless networking device of the vehicle without user intervention.

8. A system, comprising:
   one or more processors; and
   one or more memories storing instructions executable on the one or more processors to:
      cause a wireless networking device of a vehicle to transmit, via a wireless network hosted by the wireless networking device of the vehicle, a vehicle network advertisement beacon over a first communication channel to a multifunction device, wherein the multifunction device is in communication with a wireless network provided by a fixed location base station using a first communication protocol, and the vehicle network advertisement beacon is transmitted using a second communication protocol different from the first communication protocol; and
      cause to establish communication between the wireless network hosted by the wireless networking device of the vehicle and the multifunction device using the second communication protocol.

9. The system of claim 8, wherein to cause the wireless networking device of the vehicle to transmit the vehicle network advertisement beacon over the first communication channel to the multifunction device, the instructions executable on the one or more processors cause the wireless networking device of the vehicle to transmit the vehicle network advertisement beacon over a near-field communication connection to the multifunction device.

10. The system of claim 8, wherein to cause the wireless networking device of the vehicle to transmit the vehicle network advertisement beacon over the first communication channel to the multifunction device, the instructions executable on the one or more processors cause the wireless networking device of the vehicle to transmit the vehicle network advertisement beacon using Bluetooth device recognition.

11. The system of claim 8, wherein to cause to establish communication between the wireless network hosted by the wireless networking device of the vehicle and the multifunction device using the second communication protocol, the instructions executable on the one or more processors:
receive authentication information for verifying the multifunction device as an authorized user of the wireless networking device hosting the vehicle; and
cause to establish communication between resources of the vehicle and the multifunction device over the wireless network hosted by the wireless networking device of the vehicle.

12. The system of claim 8, wherein the instructions executable on the one or more processors to perform the handoff process for migrating the multifunction device from a first wireless network to the wireless network in the vehicle further comprise to cause to establish communication between the wireless network hosted by the wireless networking device of the vehicle and the multifunction device using the second communication protocol, the instructions executable on the one or more processors:
receive a query for one or more capabilities of the wireless network hosted by the wireless networking device of the vehicle; and
allocate one or more resources of the vehicle.

13. The system of claim 8, wherein to cause to establish communication between the wireless network hosted by the wireless networking device of the vehicle and the multifunction device using the second communication protocol, the instructions executable on the one or more processors:
receive a query for one or more capabilities of the wireless network hosted by the wireless networking device of the vehicle; and
responsive to an occurrence of at least one condition of a set of conditions for allocating one or more resources of the vehicle, allocate the one or more resources of the vehicle.

14. The system of claim 8, wherein to cause to establish communication between the wireless network hosted by the wireless networking device of the vehicle and the multifunction device using the second communication protocol, the instructions executable on the one or more processors:
receive, from the multifunction device, authentication information for verifying the multifunction device as an authorized user of the wireless networking device hosting the wireless network in the vehicle; and
cause to automatically establish communication between the multifunction device and resources of the vehicle over the wireless network hosted by the wireless networking device of the vehicle without user intervention.

15. A non-transitory, computer-readable storage medium, storing program instructions executable on a computer to:
cause a wireless networking device of a vehicle to transmit, via a wireless network hosted by the wireless networking device of the vehicle, a vehicle network advertisement beacon over a first communication channel to a multifunction device, wherein
the multifunction device is in communication with a wireless network provided by a fixed location base station using a first communication protocol, and
the vehicle network advertisement beacon is transmitted using a second communication protocol different from the first communication protocol; and
cause to establish communication between the wireless network hosted by the wireless networking device of the vehicle and the multifunction device using the second communication protocol.

16. The non-transitory, computer-readable storage medium of claim 15, wherein to cause the wireless networking device of the vehicle to transmit the vehicle network advertisement beacon over the first communication channel to the multifunction device, the program instructions executable on the computer to implement detecting in the multifunction device cause the wireless networking device of the vehicle to transmit the vehicle network advertisement beacon over a USB connection to the multifunction device.

17. The non-transitory, computer-readable storage medium of claim 15, wherein the program instructions executable on the computer to implement detecting in the multifunction device to cause the wireless networking device of the vehicle to transmit the vehicle network advertisement beacon over the first communication channel to the multifunction device, the program instructions executable on the computer cause the wireless networking device of the vehicle to transmit the vehicle network advertisement beacon using Bluetooth device recognition.

18. The non-transitory, computer-readable storage medium of claim 15, wherein to cause to establish communication between the wireless network hosted by the wireless networking device of the vehicle and the multifunction device using the second communication protocol, the program instructions executable on the computer:
receive authentication information for verifying the multifunction device as an authorized user of the wireless networking device hosting the wireless network in the vehicle; and
cause to establish communication between the multifunction device and resources of the vehicle over the wireless network hosted by the wireless networking device of the vehicle.

19. The non-transitory, computer-readable storage medium of claim 15, wherein to cause to establish communication between the wireless network hosted by the wireless networking device of the vehicle and the multifunction device using the second communication protocol, the program instructions executable on the computer:
receive a query for one or more capabilities of the wireless network hosted by the wireless networking device of the vehicle; and
allocate one or more resources of the vehicle.

20. The non-transitory, computer-readable storage medium of claim 15, wherein to cause to establish communication between the wireless network hosted by the wireless networking device of the vehicle and the multifunction device using the second communication protocol, the program instructions executable on the computer:
receive a query for one or more capabilities of the wireless network hosted by the wireless networking device of the vehicle; and
responsive to an occurrence of one or more of the at least one condition of a set of one or more conditions for allocating one or more resources of the vehicle, allocate the one or more resources of the vehicle.

* * * * *